United States Patent [19]
Konzorr

[11] 3,811,339
[45] May 21, 1974

[54] PEDAL FOR BICYCLES AND SIMILAR VEHICLES
[75] Inventor: Hubert Konzorr, Unna, Germany
[73] Assignee: Union Sils, van de Loo & Co., Frondenberg, Germany
[22] Filed: Aug. 14, 1973
[21] Appl. No.: 388,227

[30] Foreign Application Priority Data
Aug. 17, 1972 Germany............................ 2240484

[52] U.S. Cl. ............................................. 74/594.4
[51] Int. Cl. .............................................. B62m 3/12
[58] Field of Search ................................... 74/594.4

[56] References Cited
UNITED STATES PATENTS
547,639  10/1895  Grubb............................... 74/594.4

FOREIGN PATENTS OR APPLICATIONS
1,328,541  4/1963  France............................ 74/594.4

Primary Examiner—Benjamin W. Wyche
Assistant Examiner—F. D. Shoemaker
Attorney, Agent, or Firm—Walter Becker

[57] ABSTRACT

A pedal, especially for a bicycle or the like, having a spindle and two block-like members adapted to be placed in face to face engagement in surrounding relation to the spindle and having tread surfaces facing away from the spindle. The members have protrusions formed thereon on the sides facing each other with the protrusions in overlapping relation and apertured, and elongated connecting means extending through the apertures and connecting said members together.

14 Claims, 16 Drawing Figures

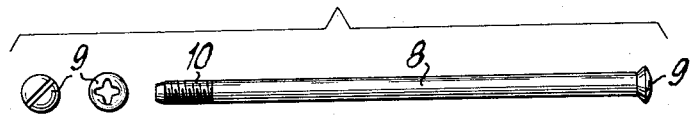
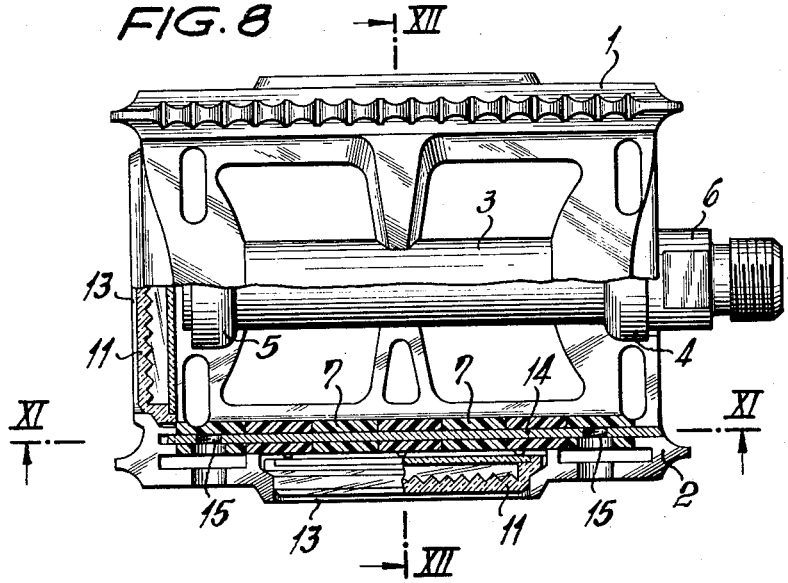
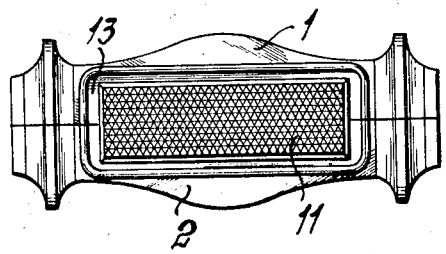

PEDAL FOR BICYCLES AND SIMILAR VEHICLES

The invention is concerned with a pedal for bicycles and similar vehicles with the body of the pedal composed of two halves which fit into each other.

With this type of pedal, the body may be made from an elastic material, i.e., a plastic material. Aside from the pedal axle and the ball housing, no other metal parts are required which must be finished with a nickel or chrome rust protector. For this reason this type of pedal construction requires only limited production efforts.

It is known that the two halves of the main part of a pedal are non-detachably connected to each other by welding. Cementing or riveting are also used for this purpose. The body of the pedal can with this type of connection no longer be removed from the pedal axle for replacement.

It is an object of the invention to provide a pedal for bicycles comprising sections which can be joined together in a simple manner so as to form a tight fitting pedal body which can be easily detachably connected to the pedal axle and the ball housing thereof.

These and other objects and advantages of the invention will appear more clearly from the following specification in connection with the accompanying drawings in which:

FIG. 7 illustrates a connecting pin for connecting the two sections making up the pedal according to the invention.

FIG. 8 illustrates in top view and partially in section a sport pedal according to the invention.

FIG. 9 is a front view of FIG. 8.

Figure 1:
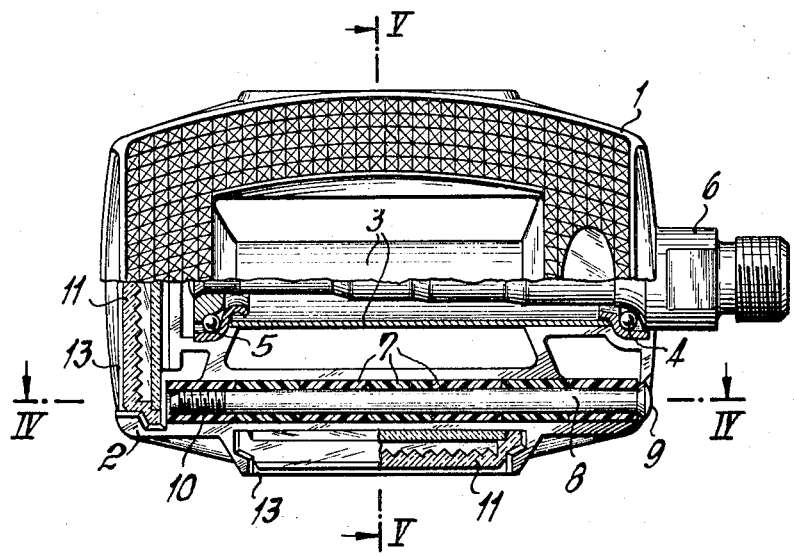
FIG. 1 illustrates in top view and partially in section a frame pedal according to the invention.
Figure 2:
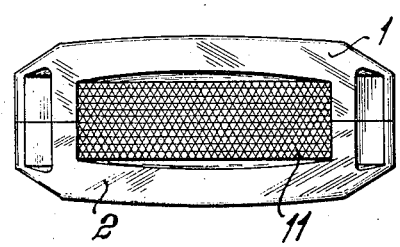
FIG. 2 is a front view of FIG. 1.
Figure 3:
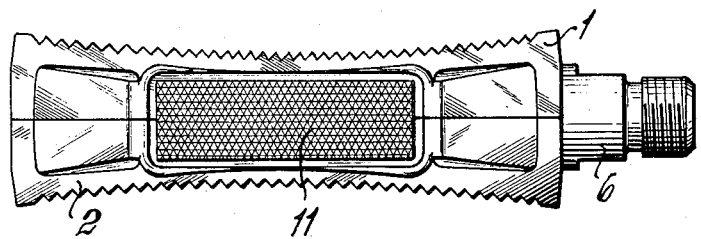
FIG. 3 is a side view of FIG. 1.
Figure 4:
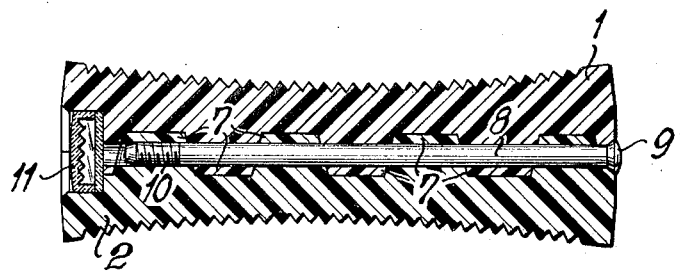
FIG. 4 represents a longitudinal section along the line IV—IV of FIG. 1.
Figure 5:
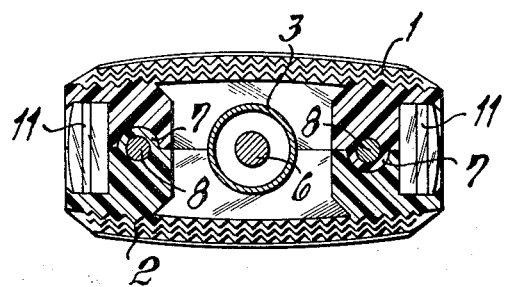
FIG. 5 is a cross section taken along the line V—V of FIG. 1.

The pedal according to the present invention, which is intended for bicycles and similar vehicles and has a pedal body composed of two sections, is characterized primarily in that the bottom sides of the two pedal sections are provided with bracket shaped connecting means which are engaged by connecting elements insertable from the outside into said connecting means and extending in the direction of the tread surface plane and firmly connecting said two pedal sections to each other.

These bracket shaped connecting means are best formed on the underside of the pedal sections and, preferably, take the shape of eyes. These eyes are arranged in such a manner that each single pedal section can serve as the upper or lower pedal section. It is suggested so to arrange the eyes along the longitudinal side of the respective pedal section that when connecting the pedal sections to each other, they will engage each other in the manner of a hinge.

As connecting elements for the two sections, there can be used pins, wedges or strips which can be inserted into the eyes of the body from the outside. In order that the two pedal sections, when being connected are pressed firmly against each other, the connecting pieces and the eyes are provided with inclined tightening surfaces. In order to prevent loosening of the connecting pieces it is advisable that the tightening surfaces and the eyes be roughened.

In order to permit the fitting of toe holds on sport pedals, it is suggested to provide the connecting pieces with appropriate threaded bores. Moreover additional rigidity of the pedal proper can be achieved by a bracket shaped design of the connecting piece. The bracket shaped design of the connecting piece is preferably such that the front of the pedal is protected against damage.

According to a further development of the invention the two pedal sections may, in a known manner, be provided with recesses for the reception of reflectors or decorative pieces. In order to increase the wear resistance of the body of the pedal, the two pedal sections may be made from an abrasion resistant, non-skid plastic material, such as glass fiber reinforced polyamide.

Referring now to the drawings in detail, in the pedal shown in FIGS. 1 to 5, the pedal body is formed of the two interconnected pedal sections, 1 and 2 and, in the usual manner, is by means of a sleeve 3 and the two ball bearings 4 and 5, journalled on the pedal pin 6. The pedal pin 6 and the two ball bearings 4 and 5, form together with the sleeve 3, a constructional unit having mounted thereon the two pedal sections 1 and 2. On the bottom side of the two sections 1 and 2, and along both longitudinal sides, there are arranged eyes 7 which engage each other in a hinged manner. The intervals between the individual eyes 7 are so selected that each of said two sections can be used as upper or lower part. Both sections 1 and 2 are held together by means of two pins 8, which are introduced to the eyes 7 from the outside.

As will be sseen from FIG. 7, the pins 8 are provided at one end with a screw head 9, and at the other with a threaded shaft 10, which is designed as a self tapping screw. In view of this design, the pin 8 can by means of the screw shaft 10 be screwed into the taphole of the last eye 7, and is in this way secured against slipping out.

For purposes of mounting reflectors 11 or decorations 12, recesses 13 are provided which are located on the two longitudinal sides and at the front of the pedal body, said recesses being formed when the two sections 1 and 2 are joined.

Figure 6:
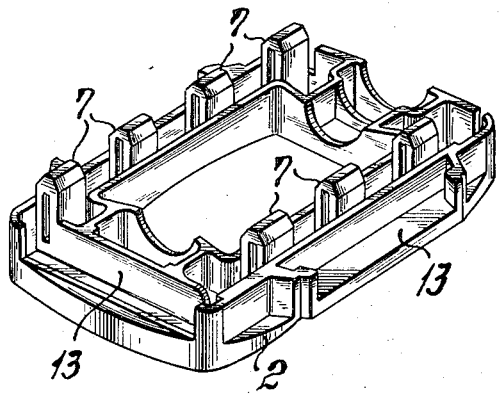
FIG. 6 is an isometric view of one section of a pedal according to the invention.
Figure 10:
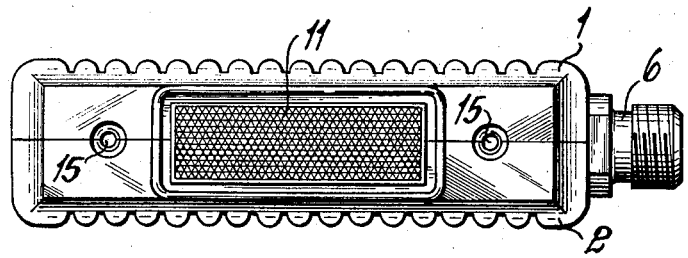
FIG. 10 is a side view of FIG. 8.
Figure 11:
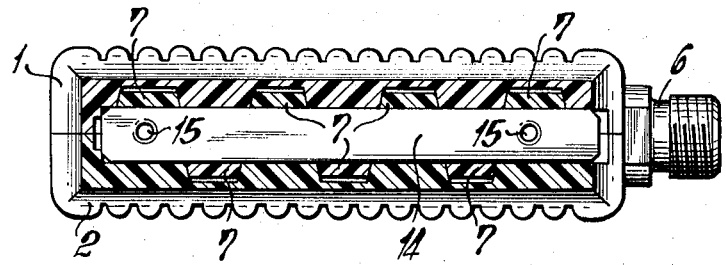
FIG. 11 represents a longitudinal section taken along the line XI—XI of FIG. 8.
Figure 12:
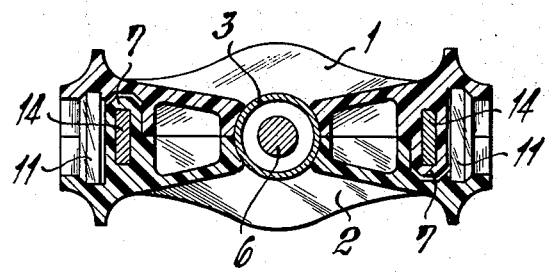
FIG. 12 is a cross section taken along the line XII—XII of FIG. 8.
Figure 13:
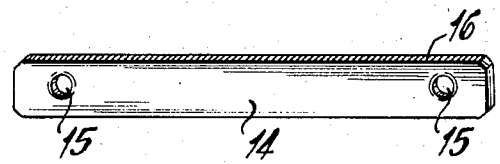
FIG. 13 is a strip for connecting the two sections of a pedal according to the invention.

FIG. 6 shows a pedal section, the eyes 7 of which are provided for the reception of a wedge or strip shaped connecting element. The use of strips 14 makes it possible to keep the body of the pedal narrow.

The embodiments shown in FIGS. 8 to 12 corresponds substantially to the pedal described in the FIGS. 1 to 5, and is intended to show that the invention is applicable not only to pedals of the ordinary type of constructions but also to sport pedals. As connecting elements for the two pedal sections 1 and 2, narrow strips 14 are used which can from the outside be inserted into the eyes 7. In order to be able at any time to mount or attach racing toe caps to the longitudinal side of the pedal, the strips 14 are provided with two threaded holes accessible from the outside into which holes the connecting screws of the racing toe caps may be screwed. In order to prevent the strips 14 from accidentally coming loose, they are roughened on the outer edges 16.

The pedal body is also provided with recesses 13, which are formed when the two pedal sections 1 and 2 are fitted together and are intended for the receiption of reflectors 11 or decorative pieces 12.

Figure 14:
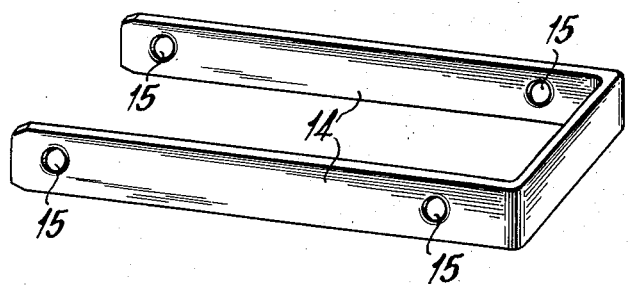
FIG. 14 shows a U-shaped bar for the connection of the two sections of a pedal according to the invention.

In order to realize additional rigidity of the pedal body, the strips 14 may be of U-shape and of metal as is shown in FIG. 14. At the same time the said U-shape protects the front of the pedal against damage.

Figure 15:
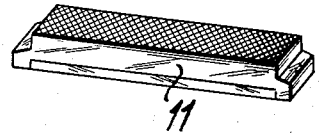
FIG. 15 is a perspective view of a reflector for a pedal according to the invention.
Figure 16:
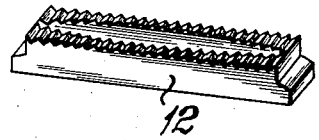
FIG. 16 is an isometric view of a decorative piece for use in connection with the pedal according to the invention.

FIG. 15 shows a back reflector body 11 which is insertable into the recess 13, and FIG. 16 illustrates a decorative piece 12 of the same dimensions.

The advantages realized by the invention consist primarily in that during the assembly of the pedals, aside from the pedal axle and the bearings parts therefor, only a few further single parts have to be held in readiness. The two pedal sections of the pedal body may be cup-shaped and may be made by pressing, extending or injecting synthetic material or metal. The pedal is easily assembled and can be disassembled at any time in order to replace worn sections or damaged reflectors.

It is, of course to be understood that the present invention is, by no means, limited to the specific showings in the drawings but also comprises any modifications within the scope of the appended claims.

What is claimed is:

1. In a bicycle pedal; a spindle, frame means rotatable on the spindle, a member on each side of the frame means and each having a tread surface facing away from the frame means for engagement by the foot, said members having opposed faces in about the plane of the spindle, overlapping protrusions on said opposed faces, and connecting means extending generally parallel to said spindle and through said protrusions and interconnecting said members.

2. A pedal according to claim 1 in which said protrusions are in the form of apertured lugs integral with said members.

3. A pedal according to claim 1 in which the protrusions are distributed in spaced relation along lateral regions of each member which are equally spaced from the spindle on opposite sides thereof, the protrusions in one of said regions being staggered longitudinally relative to those in the other of said regions whereby said members are reversible, said connecting means extending parallel to the spindle along each said lateral region.

4. A pedal according to claim 3 in which said connecting means are rods.

5. A pedal according to claim 3 in which said connecting means are elongated and insertable endwise into said members from one end and extend substantially the full length of the members.

6. A pedal according to claim 2 in which said lugs taper inwardly toward one another and each lug on one member wedgingly fits between a pair of lugs on the other member when said members are assembled on said frame.

7. A pedal according to claim 6 in which the inclined interengaging side surfaces of said lugs are roughened.

8. A pedal according to claim 5 in which said connecting means is provided with threaded bores perpendicular to the spindle and adapted for receiving screws to connect a racing toe cap to the pedal.

9. A pedal according to claim 2 in which said connecting means is in the form of a U-shaped strip having legs extending through said protrusions.

10. A pedal according to claim 1 which includes lateral recess means defined by said members when in assembled relation for receiving reflector or decorative elements disposed substantially perpendicular to said tread surfaces.

11. A pedal according to claim 1 in which said members are molded from a synthetic material.

12. A pedal according to claim 1 in which said members are molded from polyamide and include reinforcing glass fibers.

13. A pedal according to claim 4 in which said rods threadedly engage at least one protrusion each.

14. A pedal according to claim 1 in which said frame comprises bearing cups coaxial with said spindle and an axial sleeve extending therebetween, said members engaging said bearing cups.

* * * * *